United States Patent
Okano

(10) Patent No.: US 8,542,254 B2
(45) Date of Patent: Sep. 24, 2013

(54) GRAPH DISPLAY CONTROL APPARATUS AND GRAPH DISPLAY CONTROL METHOD

(75) Inventor: Mitsuru Okano, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 764 days.

(21) Appl. No.: 12/704,621

(22) Filed: Feb. 12, 2010

(65) Prior Publication Data

US 2010/0225649 A1 Sep. 9, 2010

(30) Foreign Application Priority Data

Mar. 6, 2009 (JP) ................................ 2009-053640

(51) Int. Cl.
*G09G 5/00* (2006.01)

(52) U.S. Cl.
USPC .......................................... 345/661; 345/440

(58) Field of Classification Search
None
See application file for complete search history.

(56) References Cited

U.S. PATENT DOCUMENTS

| 5,303,338 A * | 4/1994 | Handa et al. ................. 345/440 |
| 5,535,317 A * | 7/1996 | Tanaka et al. ................. 345/440 |
| 6,133,924 A | 10/2000 | Ito et al. |
| 2007/0176933 A1 | 8/2007 | Culpi et al. |
| 2008/0136821 A1 | 6/2008 | Okano et al. |
| 2008/0218523 A1* | 9/2008 | Zuverink ..................... 345/473 |
| 2010/0169766 A1* | 7/2010 | Duarte et al. ................. 715/244 |

FOREIGN PATENT DOCUMENTS

| JP | 11-306370 A | 11/1999 |
| JP | 2000-250498 A | 9/2000 |
| JP | 2001-273599 A | 10/2001 |
| JP | 2002-259348 A | 9/2002 |
| JP | 2007-249527 A | 9/2007 |

OTHER PUBLICATIONS

Japanese Office Action dated May 31, 2011 (and English translation thereof) in counterpart Japanese Application No. 2009-053640.
Extended European Search Report dated Aug. 23, 2010 (in English) issued in counterpart European Application No. 10153759.5.
Vincent Fourmond and Jean-Julien Fleck: "SciYAG / Ctioga / Doc / Insects" (Jun. 7, 2008; XP-002594998).
Japanese Office Action dated Mar. 8, 2011 (and English translation thereof) in counterpart Japanese Application No. 2009-053640.

* cited by examiner

*Primary Examiner* — James A Thompson
*Assistant Examiner* — David H Chu
(74) *Attorney, Agent, or Firm* — Holtz, Holtz, Goodman & Chick, PC

(57) ABSTRACT

A graph arbitrarily input by the user is displayed on a dot-matrix display screen. When an instruction to determine any one of the characteristic points, such as intersections, local maxima, or local minima, is given, an characteristic point to be determined is calculated and the result is pointed by pointer P and, at the same time, the coordinates (X, Y) of the characteristic point are displayed. Depending on whether there is one other graph which overlaps or makes contact with the characteristic point of the graph and displayed dots of the graph near the characteristic point, it is determined whether a locus of the graph near the characteristic point is displayed unclearly. If the condition for unclear display has been satisfied, the graph including the characteristic point is enlarged repeatedly at the enlargement factor set by the user until the condition for unclear display is not fulfilled.

12 Claims, 4 Drawing Sheets

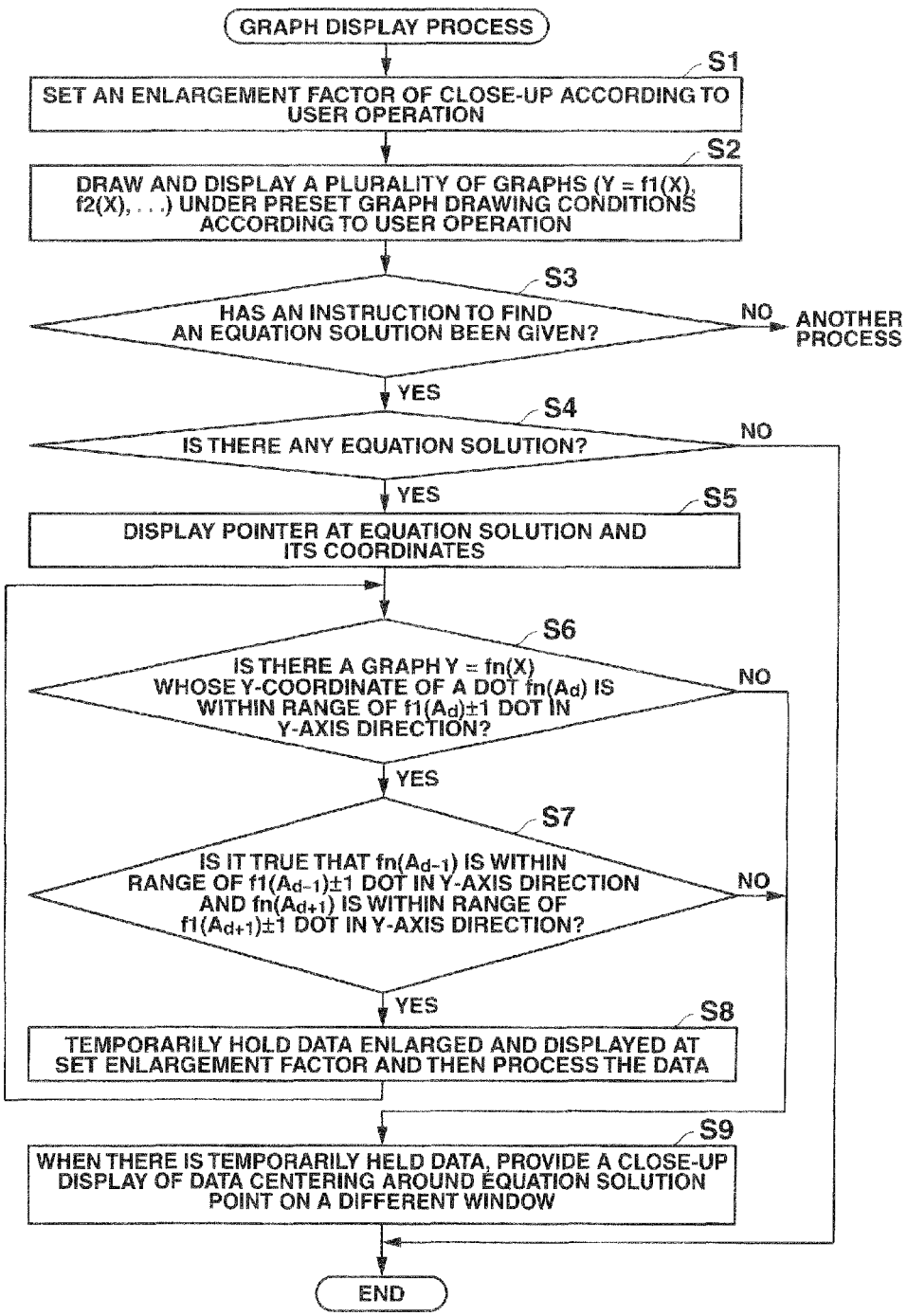

GRAPH DISPLAY CONTROL APPARATUS AND GRAPH DISPLAY CONTROL METHOD

CROSS-REFERENCE TO RELATED APPLICATIONS

This application is based upon and claims the benefit of priority from prior Japanese Patent Application No. 2009-053640, filed Mar. 6, 2009, the entire contents of which are incorporated herein by reference.

BACKGROUND OF THE INVENTION

1. Field of the Invention

This invention relates to a graph display control apparatus and a graph display control method which display a plurality of graphs simultaneously.

2. Description of the Related Art

Some of the known electronic calculators, including scientific electronic calculators, are so-called graph function calculators which have the function of displaying a graph corresponding to a mathematical expression input by the user.

When the user inputs a function expression and gives an instruction to draw a graph, the graph function calculator draws and displays a graph on the orthogonal coordinates. Thereafter, the graph function calculator finds characteristic points (or equation solution points), such as a maximum and a minimum of the graph or the intersections of graphs, and displays their positions or values.

Because (1) the screen is small and (2) the resolution of the dot-matrix display is low, the graph function calculator has the problem of being incapable of visualizing the state near the equation solution point accurately.

With such a graph function calculator, the user can enlarge and display a graph by manual operations, but has the following problems: (1) the manual operations are laborious and (2) the enlarged display causes only a part of the graph to be displayed, preventing the entire picture from being comprehended.

To overcome those problems, a graph function calculator has been considered which has the function of enlarging and displaying only a specified range of the graph, while causing the display size of the entire graph to remain unchanged (e.g., refer to Jpn. Pat. Appln, KOKAI Publication No, 2002-259348).

In the case of a graph function calculator with the conventional enlarged display function, the user has to determine whether to enlarge and display the graph and then operate the calculator, making the procedure troublesome, which becomes a problem.

BRIEF SUMMARY OF THE INVENTION

An object of the invention is to provide a graph display control apparatus and a graph display control method which enable characteristic points of a graph to be always displayed clearly without requiring the user to determine whether to provide enlarged display.

According to an aspect of the invention, there is provided a graph display control apparatus comprising: a display unit; a graph display control unit which performs display control of a plurality of graphs on the display unit; a characteristic point computing unit which calculates a characteristic point on an arbitrary graph displayed on the display unit according to a user operation; a display determination unit which determines whether there is one other graph displayed on the display unit within a range of a preset display area from a characteristic point on the graph calculated by the characteristic point computing unit; and an enlarged display control unit which, when the display determination unit has determined that there is one other graph in the range of the preset display area from the characteristic point on the graph, performs enlarged display control of said plurality of graphs displayed on the display unit including the characteristic point at a magnification at which the one other graph becomes nonexistent in the range of the preset display area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart to explain a graph display process of the graph function calculator 10;

DETAILED DESCRIPTION OF THE INVENTION

Hereinafter, referring to the accompanying drawings, an embodiment of the invention will be explained.

Figure 1:
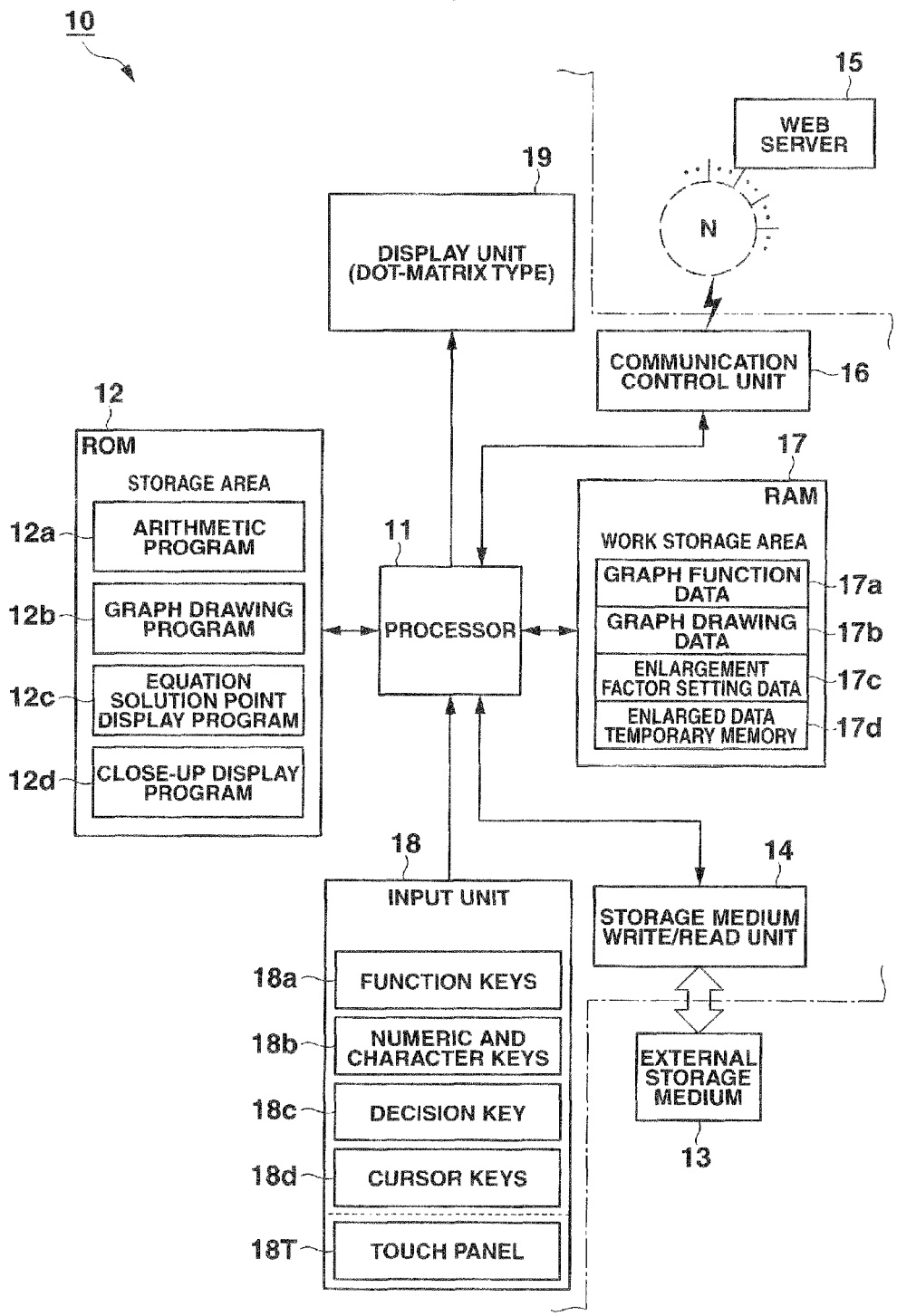
FIG. 1 is a block diagram showing a configuration of the electronic circuitry of a graph function calculator 10 according to an embodiment of a graph display control apparatus of the invention.

As shown in FIG. 1, a graph function calculator 10 includes a processor 11.

The processor 11 controls the operation of each part of the circuitry by use of a work storage area 17 (e.g., random access memory [RAM]) according to a system program previously stored in a storage area 12 (e.g., a flash memory), a computer control program read into the storage area 12 from an external storage medium 13 (e.g., a memory card) via a storage medium read/write unit 14, or a computer control program downloaded into the storage area 12 from a Web server (or a program server) 15 on a communication network N via a communication control unit 16. The system program or computer control program previously stored in the storage area 12 is activated according to an input signal from an input unit 18.

Connected to the processor 11 are the storage area 12, the storage medium read/write unit 14, the communication control unit 16, the work storage area 17, the input unit 18, and a display unit 19 which provides dot-matrix display (e.g., a liquid-crystal display [LCD]).

The storage area 12 stores a computer control program which supervises the entire operation of the graph function calculator 10, an arithmetic program 12a which performs arithmetic processing according to various mathematical expressions, such as equations and inequalities including various functions, input by the user and causes the display unit 19 to display the computing processes and computations, a graph drawing program 12b which causes the display unit 19 to display graphs according to various mathematical expressions input by the user, an equation solution point display program 12c which performs mathematic processing to find characteristic points (including equation solution points: intersections, local maxima/minima, and inflection points) on the graph displayed on the display unit 19 according to the graph drawing program 12b, and a close-up display program 12d which enlarges the graph automatically and displays the vicinity of the characteristic point on a window (e.g., see FIG. 3C) if the characteristic point on the graph displayed on the display unit 19 according to the graph drawing program 12b satisfies the condition for preset unclear display described later (e.g., S6 and S7 in FIG. 2).

The input unit 18 is provided with various function keys 18a which are operated to specify functions in various compute modes provided on the graph function calculator 10, numeric and character keys 18b which are operated to input data on various numerical values, characters, and symbols, Decision key 18c which is operated to acknowledge the input data or specify the execution of a calculation, and cursor keys 18d, "↑," "↓," "←," "→," which are operated to move and display pointer P on the target graph or scroll the display range.

The input unit 18 includes a touch panel 18T. The touch panel 18T is composed of a transparent tablet which is laid on the display screen of the display unit 19 to enable data on the position touched by the user to be input.

In the work storage area 17, a work storage area is secured to temporarily store various data items input and output to and from the processor 11 as a result of various types of arithmetic processing. As a work storage area needed in a graph mode, a graph function data memory 17a, a graph drawing data memory 17b, an enlargement factor setting data memory 17c, an enlarged data temporary memory 17d, and the like are secured.

The graph function data memory 17a stores a graph function $Yn=fn(X)$ input by the user at the input unit 18.

The graph drawing data memory 17b stores drawing data on a graph to be displayed on the orthogonal coordinates displayed on the display unit 19 as a graph corresponding to the graph function $Yn=fn(X)$ in the form of data that causes the coordinates $(Xd, Yd)$ of a display dot to correspond to the coordinates $(X, Y)$ of the calculated graph drawing.

The enlargement factor setting data memory 17c stores an enlargement factor in causing the drawing data on the graph stored in the graph drawing data memory 17b to be displayed on the display screen of the display unit 19 at an enlargement factor (e.g., ×2) set by the user operation.

The enlarged data temporary memory 17d stores drawing data on the graph enlarged according to the enlargement factor stored in the enlargement factor setting data memory 17c.

Next, the graph display function executed by the graph function calculator 10 configured as described above will be explained.

A concrete example (part 1) of a graph display in a graph display process carried out by the graph function calculator 10 will be explained.

When the graph display display mode is activated, the display unit 19 displays an enlargement factor setting screen (not shown) which is used to set an enlargement factor for graph enlargement display arbitrarily according to the user operation. When, for example, an enlargement factor of ×2 has been set on the enlargement factor setting screen, the enlargement factor setting data is stored in the enlargement factor setting data memory 17c in the work storage area 17 (step S1).

Figure 3A:
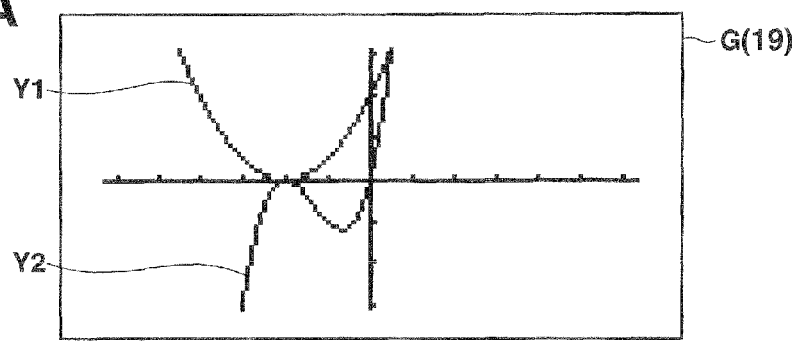
FIGS. 3A, 3B and 3C show concrete examples (part 1) of graph representations given by a graph display process of the graph function calculator 10.

In a state where graph functions (e.g., $Y1=(X+2)^2/2$ and $Y2=X(X+1.9)(X+2.1)$) input by the user from the input unit 18 have been stored in the graph function data memory 17a in the work storage area 17, when the drawing of a graph is specified by the operation of Decision key 18c, drawing data of graphs corresponding to the graph equations Y1, Y2 are generated according to preset initial conditions (e.g., $-6.3 \leq X \leq 6.3, -3.1 \leq Y \leq 3.1$) and stored in the graph drawing data memory 17b. As shown in FIG. 3A, the graphs Y1, Y2 corresponding to the graph drawing data stored in the graph drawing data memory 17b are displayed on a graph display screen G the display unit 19 (step S2).

Then, when an instruction to find characteristic points (in this case, intersections) of graph Y1 displayed on the graph display screen G is input (Yes in step S3), arithmetic processing is performed on the basis of the drawing data on the graph to find characteristic points or intersections and it is determined whether there are characteristic points (or equation solution points) (step S4).

In this case, two intersections with graph Y2 are found and it is determined that graph Y1 has characteristic points (or equation solution points) (Yes in step S4).

Figure 3B:
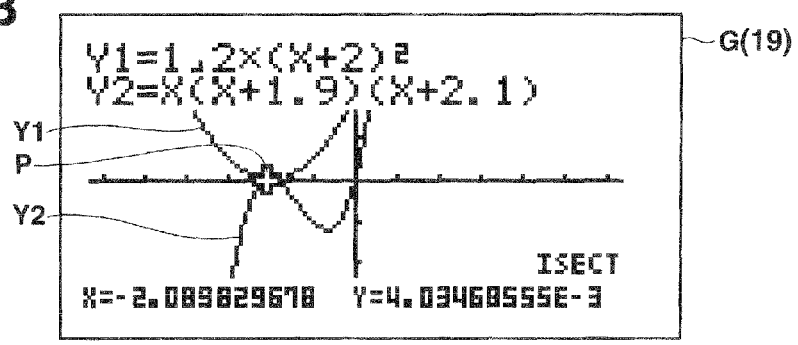

As shown in FIG. 3B, of the two characteristic points (or intersections) found on graph Y1, pointer P is displayed at the characteristic point (or intersection) where the X-coordinate is at a minimum and the coordinates $(X, Y)$ of the characteristic point (or intersection) are displayed (step S5).

"ISECT" on the graph display screen G displayed in FIG. 3B is an abbreviation of intersection and means that an intersection of graph Y1 and graph Y2 has been found.

Hereinafter, suppose the dot coordinates in display corresponding to the. coordinates $(X, Y)$ in calculation are $(Xd, Yd)$. In addition, suppose the dot coordinates $(Xd, Yd)$ are moved in the X-direction by "a" dots and in the Y-direction by "b" dots, giving the dot coordinates $(Xd+a, Yd+b)$.

Here, if the dot coordinates of the determined characteristic point (or intersection) of graph Y1 and graph Y2 are $(Ad, f1(Ad))$, it is determined whether there is drawing data on one other graph (in this ase, $Y2=f2(X)$) within the range of ±1 from the dot coordinates $(Ad, f1(Ad))$ of the intersection in the Y-axis direction (step S6).

In other words, it is determined whether there is a graph which overlaps the characteristic point (or equation solution point) or makes contact with the top or bottom of the characteristic point (or equation solution point).

Since the characteristic point (or equation solution point) of graph Y1 shown in FIGS. 3A and 3B is the intersection with graph Y2, it is determined that there is graph Y2 overlapping the characteristic point (or equation solution point) (Yes in step 6).

Thereafter, it is determined whether there still is drawing data on one other graph (in this case, $Y2=f2(X)$) whose presence has been determined in step S6 within the range of ±1 dot in the Y-axis direction for each of the dot coordinates $(Ad-1, f1(Ad-1))$ and $(Ad+1, f1(Ad+1))$ on graph Y1 adjacent to each other in the X-direction from the characteristic point (or intersection) on graph Y1 (step S1).

In other words, it is determined whether one other graph which overlaps the characteristic point (or equation solution point) of the graph or makes contact with the top or bottom of the characteristic point (or equation solution point) also overlaps continuously or makes contact with the top or bottom of an adjacent dot shifted by one dot in the X-direction of the characteristic point (or equation solution point) of the graph.

Furthermore, if it has been determined that a displayed dot of graph Y2 overlaps or makes contact with not only the characteristic point (or equation solution point) of graph Y1 but also a displayed dot adjacent to the characteristic point (Yes in step S7), it is determined that the condition for unclear display is fulfilled and the drawing data on graphs Y1, Y2 stored in the graph drawing data memory 17b are enlarged at an enlargement factor of ×2 set in the enlargement factor setting data memory 17c and are stored in the enlarged data temporary memory 17d (step S8).

Thereafter, it is determined again whether the graph drawing data enlarged at an enlargement factor of ×2 stored in the enlarged data temporary memory 17d satisfies the condition for unclear display (step S8→S6, S7).

Figure 3C:
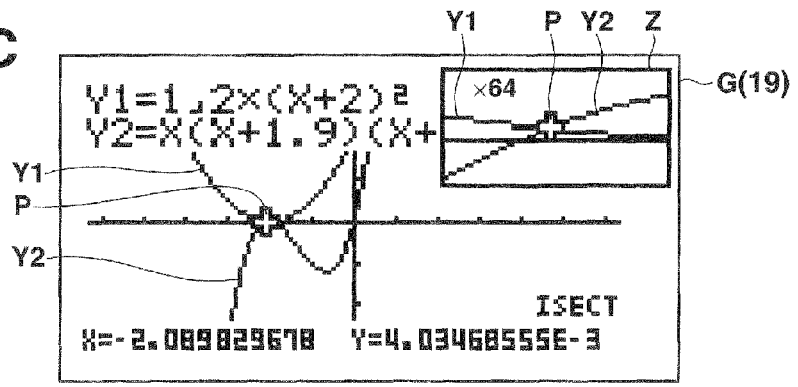

Graph drawing data on graphs Y1, Y2 shown in, for example, FIG. 3B is enlarged repeatedly according to steps S6 to S8. For example, when graph drawing data is enlarged in a sixth enlargement process [×$2^6$ (=64)], if it has been determined that the graph drawing data does not satisfy the condition for unclear display (No in step S6 or No in step S7), graph drawing data with an enlargement factor of ×64 stored in the enlarged data temporary memory 17d in step S8 is read. Then, as shown in FIG. 3C, a specific range centering around the characteristic point (or equation solution point) is set as a different window, which is displayed together with a magnification of ×64 on a close-up screen Z (step S9).

With the close-up screen, what locus of a graph is drawn near the intersection with graph Y2, the characteristic point (or equation solution point) of graph Y1, can be clearly displayed automatically in a state where the overall image of the graph can be comprehended.

Next, a concrete example (part 2) of graph display in the graph display process carried out by the graph function calculator 10 will be explained.

When an arbitrary enlargement factor (e.g., ×2) is set by the user on the enlargement factor setting screen displayed on the display unit 19 as a result of the activation of the graph display mode, the enlargement factor setting data is stored in the enlargement factor setting data memory 17c of the work storage area 17 (step S1).

Figure 4A:
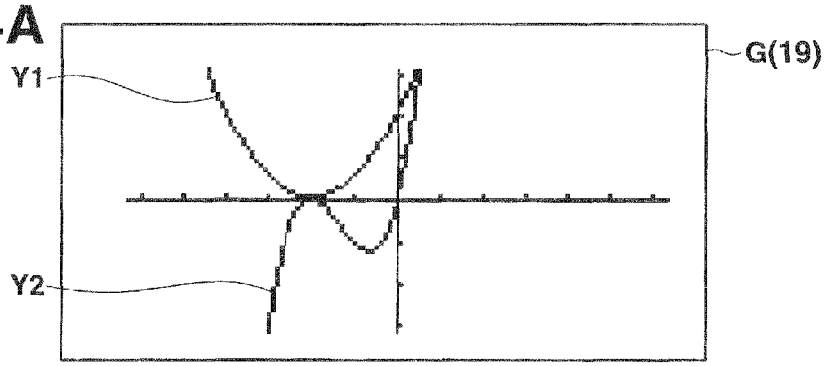
FIGS. 4A, 4B, 4C and 4D show concrete examples (part 2) of graph representations given by the graph display process of the graph function calculator 10.

When graph equations "Y1=(X+2)^2/2+0.1" and "Y2=X (X+1.9)(X+2.1)" are input by the user and graph drawing is specified by operating "Decision key" 18c in a state where the graph equations are stored in the graph equation data memory 17a of the work storage area 17, graph drawing data corresponding to the graph equations Y1, Y2 are generated according to preset initial conditions [−6.3≦X≦6.3, −3.1≦Y≦3.1] and are stored in the graph drawing data memory 17b. Then, as shown in FIG. 4A, graphs Y1, Y2 corresponding to the graph drawing data stored in the graph drawing data memory 17b are displayed on a graph display screen G on the display unit 19 (step S2).

When an instruction to find a characteristic point (or a local minimum) of the graph has been input by the user for graph Y1 displayed on the graph display screen G (Yes in step S3), arithmetic processing is performed to find the characteristic point (or the local minimum) on the basis of the graph drawing data.

Figure 4B:
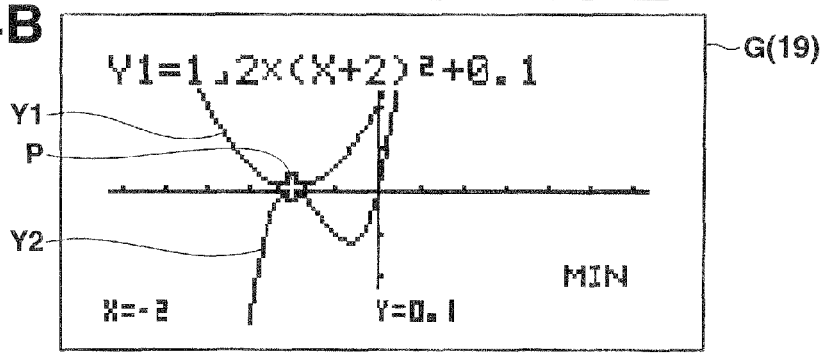

When the characteristic point (or local minimum) has been determined (Yes in step S4), pointer P pointing at the characteristic point (or local minimum) is displayed on graph Y1 on the graph display screen G as shown in FIG. 4B and the coordinates (X, Y) of the characteristic point (or local minimum) are displayed (step S5).

"MIN" on the graph display screen G shown in FIG. 4B means that a local minimum of graph Y1 has been determined.

At this time, in the graph drawing data with a standard magnification of ×1 shown in FIGS. 4A and 4B, a displayed dot corresponding to a local minimum of graph Y1 and displayed dots in front of and behind the local minimum in the X-direction overlap continuously or make contact with displayed dots of graph Y2, with the result that a locus of the graph near the determined characteristic point (or local minimum) is unclear.

Accordingly, it is determined that the one other graph Y2 which overlaps the characteristic point (or local minimum) of graph Y1 or makes contact with the top or bottom of the characteristic point (or local minimum) further overlaps continuously adjacent displayed dots shifted by one dot in the X-direction with respect to the characteristic point (or local minimum) of graph Y1 or further makes contact with the top or bottom of the characteristic point (or local minimum [Yes in step S6→Yes in step S7]).

At an enlargement factor of ×2 set in the enlargement factor setting data memory 17c, the drawing data on graphs Y1, Y2 stored in the graph drawing data memory 17b are enlarged and stored in the enlarged data temporary memory 17d (step S8).

If it has been determined that the graph drawing data enlarged at an enlargement factor of ×2 stored in the enlarged data temporary memory 17d has failed to satisfy the condition for unclear display (No in step S6 or S7), the graph drawing data with an enlargement factor of ×2 stored in the enlarged data temporary memory 17d is read.

Figure 4C:
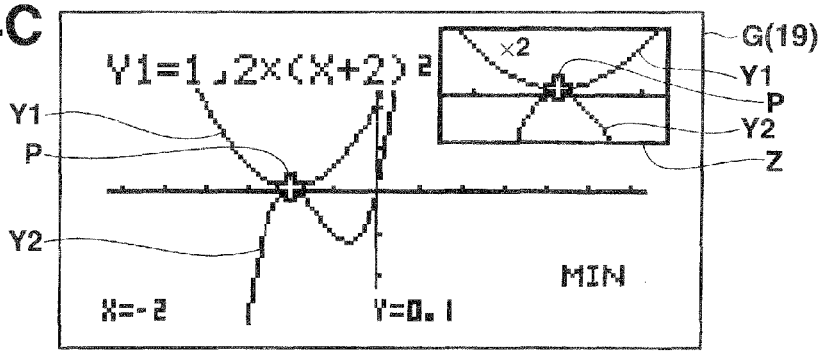

As shown in FIG. 4C, a specific range centering around the characteristic point (or local minimum) is set as a different window, which is displayed together with a magnification of ×2 on a close-up screen Z (step S9).

Figure 4D:
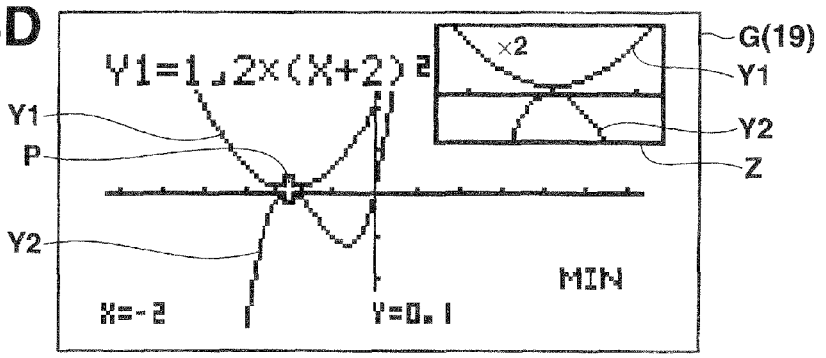

By doing this, what locus of the graph is drawn near the local minimum, the characteristic point (or equation solution point) of graph Y1, can be clearly displayed automatically in a state where the overall image of the graph can be comprehended.

by operating a specific key on the input unit 18, pointer P on graph Y1 on the close-up screen Z is erased as shown in FIG. 4D.

Accordingly, with the graph display function of the graph function calculator 10 configured as described above, a graph corresponding to a graph equation arbitrarily input by the user is displayed on a dot-matrix display screen. When an instruction to determine any one of the characteristic points, such as intersections, local maxima, or local minima, is given, an characteristic point to be determined is calculated and the result is pointed by pointer P and, at the same time, the coordinates (X, Y) of the characteristic point are displayed. Depending on whether there is one other graph which overlaps or makes contact with the characteristic point of the graph and displayed dots of the graph near the characteristic point, it is determined whether a locus of the graph near the characteristic point is displayed unclearly. If the condition for unclear display has been satisfied, the graph including the characteristic point is enlarged repeatedly at the enlargement factor set by the user until the condition for unclear display is not fulfilled.

Accordingly, if the characteristic point on the displayed graph is displayed unclearly because it is close to the locus of one other graph, it is enlarged automatically until it is displayed clearly.

Then, since the enlarged graph is displayed together with its enlargement factor on the original graph display screen G in the form of a close-up screen Z on a different window, what locus of the graph is drawn near the characteristic point (or equation solution point) of the graph can be clearly displayed automatically in a state where the overall image of the graph can be comprehended.

Furthermore, since the characteristic point determined on the graph is identified by pointer P and displayed, where the characteristic point is on the graph can be known easily and clearly.

Under the conditions for the determination of unclear display of the characteristic point (or local minimum) of the graph explained with reference to steps S6 and S7 of FIG. 2 in the embodiment, it is determined whether there is a displayed dot of one other graph within the range of ±1 dot along the Y-axis about displayed dots of the determined characteristic point and displayed dots of the graph adjacent to the characteristic point. The range along the Y-axis for determining whether there is a locus of one other graph near the characteristic point of the graph is, of course, not limited to the range of ±1 dot. For instance, the criterion may be made less strict or stricter by making the range along the Y-axis greater or smaller than the range of ±1 dot.

While in the embodiment, the enlarged graph has been displayed in a different window on the original graph display screen G, it may be displayed on the original graph display screen G without a different window.

The methods implemented by the graph function calculator 10 written in the embodiment, including graph display processing shown in the flowchart of FIG. 2, can be stored in an external storage medium (13), such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered. The computer (11) of the electronic calculator (10) loads the programs stored in the external storage medium (13) into the storage units (12), (17). The computer is controlled by the read-in programs, thereby realizing the graph display function capable of automatically providing an enlarged display of the vicinity of the characteristic point of the graph explained in the embodiment, which enables the same processes in the aforementioned methods to be carried out.

Furthermore, the data of the programs which realize the above methods can be transferred in the form of program code through a communication network (public line) N. The program data can be loaded by communication unit (16) connected to the communication network N into the computer (11) of the electronic calculator (10), thereby realizing the graph display function capable of automatically providing an enlarged display of the vicinity of the characteristic point of the graph.

Additional advantages and modifications will readily occur to those skilled in the art. Therefore, the invention in its broader aspects is not limited to the specific details and representative embodiments shown and described herein. Accordingly, various modifications may he made without departing from the spirit or scope of the general inventive concept as defined by the appended claims and their equivalents.

What is claimed is:

1. A graph display control apparatus comprising:
a dot-matrix display unit;
a graph display control unit which performs display control of a plurality of graphs on the display unit;
a characteristic point computing unit which calculates a characteristic point on an arbitrary graph displayed on the display unit according to a user operation;
a display determination unit which determines (i) whether another graph displayed on the display unit is within a first range of a preset number of dots in a Y-axis direction about a display dot of the characteristic point on the graph calculated by the characteristic point computing unit, and (ii) whether the another graph displayed on the display unit is within a second range of the preset number of dots in the Y-axis direction about a display dot on the graph shifted by one dot in an X-axis direction from the characteristic point; and
an enlarged display control unit which, when the display determination unit has determined that the another graph is within the first range and the second range, performs enlarged display control of said plurality of graphs displayed on the display unit including the characteristic point until the another graph is no longer within one of the first range and the second range.

2. The graph display control apparatus according to claim 1, wherein the enlarged display control unit performs display control of both (i) said plurality of graphs displayed on the display unit and (ii) an enlarged graph including the characteristic point on a different screen on the display unit.

3. The graph display control apparatus according to claim 2, wherein the enlarged display control unit displays a magnification at which the enlarged display control is performed.

4. The graph display control apparatus according to claim 3, further comprising:
a characteristic point display control unit which identifies the characteristic point on the graph calculated by the characteristic point computing unit and performs display control of both (i) the characteristic point on the graph displayed on the display unit and (ii) coordinate values of the characteristic point.

5. A graph display control apparatus comprising:
a dot-matrix display unit;
an input unit; and
a processor which:
performs display control of a plurality of graphs on the display unit,
calculates a characteristic point on an arbitrary graph displayed on the display unit according to an input from the input unit,
determines (i) whether another graph displayed on the display unit is within a first range of a preset number of dots in a Y-axis direction about a display dot of the calculated characteristic point on the graph, and (ii) whether the another graph displayed on the display unit is within a second range of the preset number of dots in the Y-axis direction about a display dot on the graph shifted by one dot in an X-direction from the characteristic point, and
when it has been determined that the another graph is within the first range and the second range, performs enlarged display control of said plurality of graphs displayed on the display unit including the characteristic point until the another graph is no longer within one of the first range and the second range.

6. The graph display control apparatus according to claim 5, wherein the processor performs display control of both (i) said plurality of graphs displayed on the display unit and (ii) an enlarged graph including the characteristic point on a different screen on the display unit.

7. The graph display control apparatus according to claim 6, wherein the processor further displays a magnification at which the enlarged display control is performed on the display unit.

8. The graph display control apparatus according to claim 7, wherein the processor identifies the calculated characteristic point on the graph and further performs display control of both (i) the characteristic point on the graph displayed on the display unit and (ii) coordinate values of the characteristic point.

9. A method of performing display control of graphs with a computer having a dot-matrix display unit, the method comprising:
    performing display control of a plurality of graphs on the display unit;
    calculating a characteristic point on an arbitrary graph displayed on the display unit according to a user operation;
    determining (i) whether another graph displayed on the display unit is within a first range of a preset number of dots in a Y-axis direction about a display dot of the calculated characteristic point on the graph, and (ii) whether the another graph displayed on the display unit is within a second range of the preset number of dots in the Y-axis direction about a display dot on the graph shifted by one dot in an X-direction from the characteristic point; and
    when it has been determined that the another graph is within the first range and the second range, performing enlarged display control of said plurality of graphs displayed on the display unit including the characteristic point until the another graph is no longer within one of the first range and the second range.

10. The method according to claim 9, further comprising:
    performing display control of both (i) said plurality of graphs displayed on the display unit and (ii) an enlarged graph including the characteristic point on a different screen on the display unit.

11. The method according to claim 10, further comprising:
    displaying a magnification at which the enlarged display control is performed.

12. The method according to claim 11, further comprising:
    identifying the calculated characteristic point on the graph and performing display control of both (i) the characteristic point on the graph displayed on the display unit and (ii) coordinate values of the characteristic point.

* * * * *